Dec. 2, 1941. J. A. BARTELT 2,264,283
ILLUMINOMETER
Filed Sept. 5, 1940  2 Sheets-Sheet 1
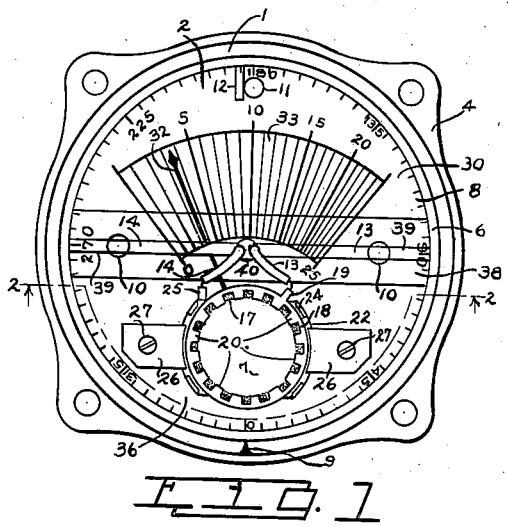
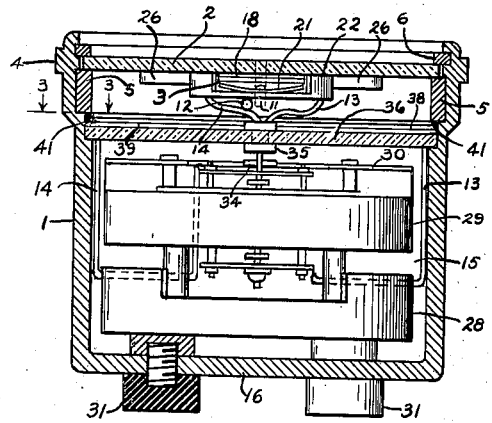
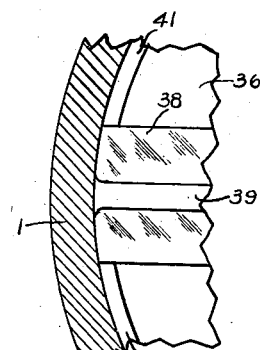
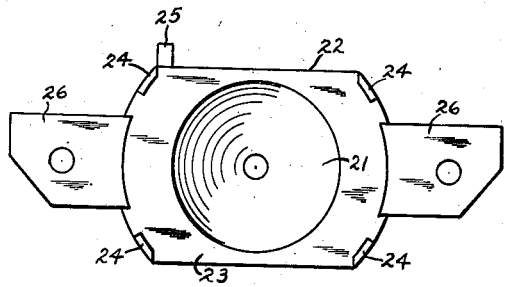
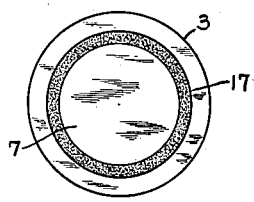
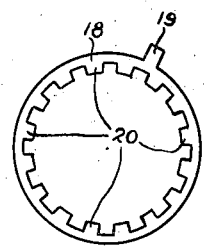
INVENTOR
JOHN A. BARTELT,
BY
ATTORNEY Dec. 2, 1941.   J. A. BARTELT   2,264,283
ILLUMINOMETER
Filed Sept. 5, 1940    2 Sheets-Sheet 2
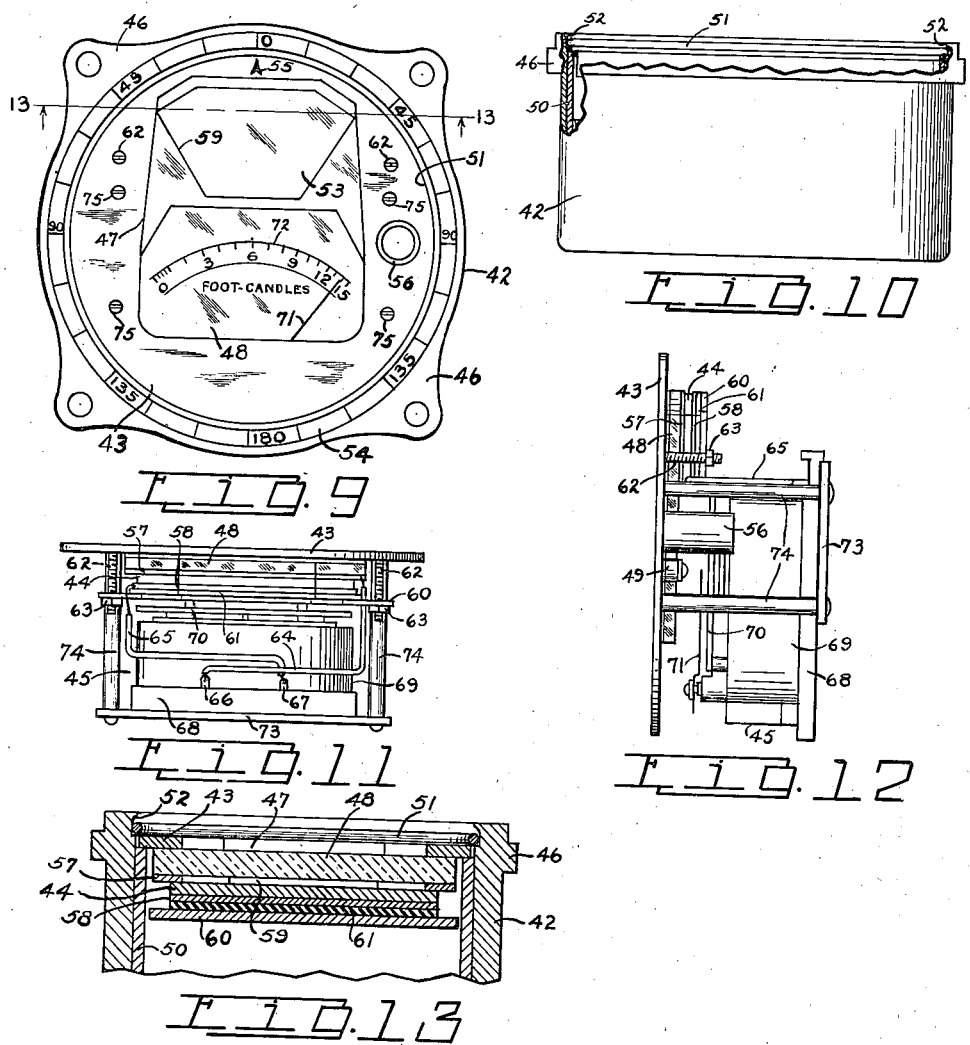
INVENTOR
JOHN A. BARTELT,
BY W. Glenn Jones
ATTORNEY Patented Dec. 2, 1941

2,264,283

UNITED STATES PATENT OFFICE 2,264,283

ILLUMINOMETER

John A. Bartelt, Arlington, Va.

Application September 5, 1940, Serial No. 355,422

12 Claims. (Cl. 88—23)

(Granted under the act of March 3, 1883, as amended April 30, 1928; 370 O. G. 757)

My invention relates to photometric apparatus and more particularly to an illuminometer for measuring the distributed illumination on the dials of panel mounted instruments.

It often becomes necessary in the case of panel mounted instruments to measure the distributed illumination on their dial surfaces in order to determine whether or not the illumination is sufficient to insure an accurate reading thereof. This is particularly important in connection with the panel mounted instruments of aircraft where a faulty instrument reading occasioned by inadequate illumination may entail serious consequences.

Known photometric means are wholly unsuited for making accurate measurements of the character above described, since the size and relative inaccessibility of the instrument openings of most panels make a coincidental positioning of the photometric surface with that of the dial under measurement highly inconvenient if not impossible. Furthermore, the known photometric means are not sufficiently portable, compact or self-contained, nor are they susceptible of rapid manipulation for obtaining the desired light measurements.

The foregoing prior art deficiencies are effectually overcome by the illuminometer of the present invention, the preferred embodiment of which includes a casing capable of being mounted on a panel to displace and occupy substantially the position of the instrument under investigation. An adjustable light pervious closure plate is mounted for revolvable movement relative to the casing and supports a photovoltaic device for movement therewith with its light sensitive surface in substantial coincidence with the surface of the displaced instrument dial in all positions of adjustment of the plate. A current meter calibrated to read in any convenient units of illumination is disposed within the casing and is electrically connected to be energized by the photovoltaic device, the meter and photovoltaic device, however, being visible through the light pervious closure plate of the casing.

Successive adjustments of the closure plate revolve the photovoltaic device with respect to the longitudinal axis of the casing. By noting the angular position of the photovoltaic device and the reading of the meter corresponding thereto at each of its successive positions of adjustment, it is possible to quickly and expeditiously determine the distributed illumination over the displaced instrument dial. Thus, it is seen that the illuminometer of the present invention is portable and durable as well as highly compact and self-contained and, at the same time, is susceptible of rapid manipulation to obtain the desired light measurements.

In the light of the foregoing, it is among the principal objects of my invention to provide an illuminometer for measuring the distributed illumination on the dials of panel mounted instruments however illuminated; to provide a device of the stated character that is portable, compact and mechanically rugged; and to provide an illuminometer that is self-contained, capable of rapid manipulation and adaptable for the measurement of the distributed illumination over the dials of panel mounted instruments however constructed or intended for use.

Other objects and many of the attendant advantages of this invention will be readily appreciated as the same becomes better understood by reference to the following detailed description when considered in connection with the accompanying sheets of drawings wherein:

Fig. 1 is a plan view of one embodiment of the illuminometer of the present invention in which the photovoltaic device and illumination indicating instrument are relatively movable;

Fig. 2 is a sectional view in side elevation taken on the line 2—2 of Fig. 1 disclosing, among other things, the superposed relation and mounting of the illumination indicating instrument, photovoltaic device and closure plate;

Fig. 3 is a partial sectional view taken on the line 3—3 of Fig. 2 depicting the channeled plate for confining the conductors interconnecting the photovoltaic device and the illumination indicating instrument, as well as the arcuate spring members for laterally immobilizing this plate;

Fig. 4 is a view in plan showing the mounting and one of the contact members associated therewith for supporting the photovoltaic device from the closure plate and providing electrical engagement with one side of the device;

Fig. 5 is a view in side elevation of the mounting and contact member depicted in Fig. 4 with the photovoltaic device shown in broken line in electrical engagement therewith;

Fig. 6 is a plan view of the photovoltaic device;

Fig. 7 shows the illumination indicating instrument, the channeled plate, the mounting for the photovoltaic device and the closure plate disassembled from the casing for further illustrating the relative disposition and construction of these parts;

Fig. 8 is a plan view of the other contact member for electrically engaging the remaining side of the photovoltaic device;

Fig. 9 is a plan view of another embodiment of the present invention of the illuminometer in which the photovoltaic device and illumination indicating instrument are mounted for conjoint movement relative to the casing;

Fig. 10 is a view in side elevation partly broken away and partly in section showing the casing and retaining ring disassembled from other parts of the illuminometer;

Fig. 11 shows the closure plate with a photovoltaic device, illumination indicating instrument and associated parts mounted thereon disassembled from the casing as viewed from the top of Fig. 9;

Fig. 12 also shows the closure plate with a photovoltaic device, illumination indicating instrument and associated parts mounted thereon disassembled from the casing but viewed from the right hand side of Fig. 9; and Fig. 13 is a partial sectional view in side elevation taken on the line 13—13 of Fig. 9 showing, among other things, certain details of construction of the closure plate and the mounting of the photovoltaic device thereon.

Turning now to the drawings and particularly to Figs. 1, 2 and 6 thereof, there is shown depicted therein a casing identified in general by the reference character 1 provided with a revolvably mounted disc-shaped closure plate 2 supporting a photovoltaic device 3 for movement therewith. The casing 1 has such a size and external configuration that it may be readily mounted on the panel to displace and occupy substantially the position of the casing of the instrument under investigation. To the achievement of this end the illuminometer casing 1 may simulate in its external appearances the instrument casing it is intended to displace and may, as indicated in the drawings, have an external configuration substantially identical with that of the instrument casing. A perforated circumferential flange 4 integral with the illuminometer casing 1 supports the same from the panel wall through the opening thereof in substantially the same position formerly occupied by the instrument casing.

The closure plate 2 in the embodiment here under discussion is fabricated of some suitable transparent material and is revolvably disposed intermediate the removable expansible resilient split rings 5 and 6 held in complementary recesses of the casing wall by their own resilience, the lower ring 5 providing a bearing surface for the plate 2 and the upper ring 6 serving to retain the plate in revolvable engagement with the lower bearing surface.

The mounting of the closure plate 2 and the photovoltaic device 3 are such that the light sensitive surface 7 of the photovoltaic device is in substantial coincidence with the surface of the displaced instrument dial in all rotative positions of adjustment of the plate. Thus, it should be clear that successive adjustments of the closure plate 2 revolve the light sensitive surface 7 of the photovoltaic device 3 about the longitudinal axis of the casing 1 and in the plane formerly occupied by the dial surface of the instrument under investigation, thus permitting a precise measurement of the distributed illumination over the instrument dial.

Suitable indicia 8 are marked on the closure plate 2 circumferentially thereof to cooperate with a single indicium 9 on the casing 1 for indicating the angular position of the photovoltaic device 3 with respect to the longitudinal axis of the casing as it is revolvably adjusted thereabout. The light pervious closure plate 2 is shown by way of example diametrically apertured at 10 (Fig. 1) to removably receive a pair of pins affixed to a handle for rotatably adjusting the plate and the photovoltaic device supported therefrom. Stop pins 11 and 12 secured respectively to closure plate 2 and the lower bearing ring 5 make it impossible to revolve the plate through more than one revolution and thus prevent undue twisting of the conductors 13 and 14 electrically connecting the photovoltaic device 3 and the illumination indicating instrument 15 rigidly affixed to the casing 1 at its lower end 16. It is evident that if undue twisting of the conductors 13 and 14 were permitted that the electrical connections between the photovoltaic device and the illumination indicating instrument might be severed.

The photovoltaic device 3 may be of any known construction for generating an electromotive force proportional to the light incident thereupon. The device disclosed in Fig. 6 of the drawings is shown for illustrative purposes as a barrier layer disc-shaped cell of the copper, cuprous oxide type in which the light sensitive surface 7 is provided with an annular sprayed metallic coating 17 for insuring good electrical contact between the upper side of the cell and its contact member.

An annular serrated electrical contact member 18 (Fig. 8) provided with a terminal lug 19 is positioned to engage the annular coating 17 on one side of the cell with its inwardly flexed resilient serrations 20, as indicated in Fig. 1. The remaining side of the cell 3 is in intimate electrical engagement with a dish-shaped or flexed resilient electrical contact member 21 that is electrically continuous with and secured to the mounting for the cell disc identified in general by the reference character 22.

As clearly shown in Figs. 4 and 5, the mounting 22 consists of a plate 23 having upwardly extending lugs 24 for facilitating the positioning and maintenance of the cell disc 3 and contact members 18, 21 in superposed relation. A terminal lug 25 is also secured to the plate 23; and perforated projections 26 extend laterally therefrom in threaded engagement with the screws 27 (Fig. 1) for supporting the assemblage from the closure plate 2 of the casing.

It should be clear from the foregoing that while the annular contact member 18 is interposed between one side of the cell disc 3 and the closure plate 2 it does not prevent the utilization of the major portion of the disc surface as a light sensitive surface 7. The screws 27 are normally adjusted in a manner to draw the mounting 22 toward the closure plate 2 so as to cause a slight flexure of the resilient contact members 18, 21 thus providing an intimate electrical engagement between the contact members and the opposite sides of the cell disc. The terminal lugs 19 and 25 are connected to the conductors 13 and 14 respectively as indicated in Fig. 1.

The illumination indicating instrument identified in general by the reference character 15 is shown as a current meter of the conventional movable coil permanent magnet type and includes an insulating base 28, a permanent magnet 29 and a dial 30 rigidly secured in superposed relation to form a unitary structure. The base 28 of the meter is attached to the wall 16 of the casing in any suitable manner as by the screw members 31. A pointer 32 affixed to the shaft of the coil movable in the field of the permanent magnet cooperates with the scale 33 of the dial (Fig. 1) which for illustrative purposes is shown calibrated in foot-candles, although any other convenient unit of illumination may be employed.

A bifurcated lever 34 conventionally secured at one of its ends to the spiral shaft spring of the movable meter coil has its bifurcation disposed for engagement with an eccentric pin of a member 35 rotatable on and adjustable from the upper face of the transparent cover plate 36 of the current meter 15, to thus provide a zero adjustment for the pointer 32, as well understood in the art. The conductors 13 and 14 (Fig. 1) are electrically connected to certain parts of the meter (Fig. 2) in a conventional manner to insure the passage of current to the movably mounted coil thereof.

The meter cover plate 36 (Figs. 1, 2 and 7) is diametrically notched at 37 to permit the passage of the conductors 13 and 14 to the upper face thereof for securement to the lugs 19 and 25 associated with the contact members. To facilitate bringing the conductors 13 and 14 to the center of the current meter for securement to these terminal lugs and to prevent the conductors from interfering with a reading of the dial 30 as the closure plate is revolvably adjusted, a transparent longitudinally channeled centrally perforated plate 38 is preferably employed with its channel 39 in alignment with the diametrical notches 37 of the cover plate 36 for confining the conductors 13 and 14 which emerge from the plate through the central perforation 40 thereof. The channeled plate 38 rests upon the upper face of the meter cover plate 36 and is laterally immobilized by the removable expansible arcuate spring members 41 engaging the sides of the channeled plate and the inner wall surfaces of the casing, as clearly indicated in Fig. 3. The channeled plate 38 and cover plate 36 are held in removable superimposed relation by the split ring 5 heretofore described.

Turning now to Figs. 9 to 13 of the drawings, there is shown depicted therein a still further embodiment of the present invention. The illuminometer there disclosed includes a casing 42 provided with a revolvably mounted disc-shaped metallic closure plate 43 supporting a photovoltaic device 44 and an illumination indicating meter 45 for conjoint movement therewith. The casing 42 has such a size and external configuration that it may be readily mounted on a panel to displace and occupy substantially the position of the casing of the instrument under investigation; and is shown by way of illustration as having an external configuration substantially identical with that of the displaced casing. A perforated circumferential flange 46 is integral with the illuminometer casing 42 and supports the same from the panel wall through the opening thereof in substantially the same position formerly occupied by the instrument casing.

The metallic closure plate 43 is provided with a substantially rectangular opening 47 that is sealed by a sheet 48 of some suitable light pervious material such as glass. The glass sheet 48 is held in secure engagement with the closure plate 43 by suitable retaining members 49, one of which is shown in Fig. 12. The revolvable closure plate 43 is mounted to engage the bearing surface of a ring 50 rigidly affixed to the inner casing wall. As shown more clearly in Fig. 13 the closure plate 43 is in sliding engagement with this bearing surface adjacent its periphery and is maintained in engagement therewith by the removable expansible resilient split ring 51 held in the beveled recess 52 of the casing through its own resilience.

As in the first embodiment of the present invention the mounting of the closure plate 43 and the photovoltaic device 44 are such that the light sensitive surface 53 of the photovoltaic device is in substantial coincidence with the surface of the displaced instrument dial in all rotative positions of adjustment of the plate. Suitable indicia 54 are marked on the casing 42 circumferentially thereof to cooperate with a single indicium 55 on the closure plate 43 for indicating the angular position of the photovoltaic device 44 with respect to the longitudinal axis of the casing as it is revolvably adjusted thereabout. A hollow cylindrical projection 56 closed only at its inner end and rigidly affixed to the closure plate 43 is intended for the reception of a pin on a handle for imparting rotation to the plate. It is of course evident that other expedients may be employed for revolving the closure disc.

The photovoltaic device 44 may be of any known construction for generating an electromotive force proportional to the light incident thereupon and is shown in the drawings for illustrative purposes as a plate shaped barrier layer cell of the copper, cuprous oxide type. The plate shaped cell 44 is positioned between upper and lower electric contact members 57 and 58 and has the major portion of its light sensitive surface 53 exposed through the opening 59 of the upper contact member 57 as clearly indicated in Fig. 9. The lower contact member 58 is a resilient plate that is longitudinally flexed when unstressed and is insulatingly supported from the mounting plate 60 by the insulating strip 61 of any known electrically non-conducting material. The mounting plate 60 is in threaded engagement with screws 62 for supporting the assemblage from the closure plate 43. Lock nuts 63 may be optionally employed for maintaining the mounting plate 60 in its final position of adjustment.

It should be clear from the foregoing that the assemblage supported from the closure plate 43 consists of the photovoltaic device 44 and its associated contact members 57, 58 together with the insulating strip 61 and that this assemblage is interposed between the mounting plate 60 and the glass sheet 48 of the closure plate 43. Screws 62 are normally adjusted in a manner to draw the mounting plate 60 toward the closure plate 43 so as to cause a flexure of the lower resilient contact member 58, thus providing an intimate electrical engagement between the contact members and the opposite sides of the cell plate 44. Conductors 64 and 65 (Fig. 11) secured respectively to the contact members 57 and 58 in any suitable fashion complete the electrical connections to the terminals 66 and 67 of the illumination indicating meter 45.

The illumination indicating instrument identified in general by the reference character 45, as in the first embodiment of the present invention, is shown as a current meter of the conventional movable coil permanent magnet type. As indicated in the drawings (Figs. 11 and 12) the meter includes an insulating base 68, a permanent magnet 69 and a dial 70 rigidly secured in superposed relation to form a unitary structure. The pointer 71 affixed to the shaft of the coil movable in the field of the permanent magnet cooperates with the scale 72 of the dial (Fig. 9) which may be conveniently calibrated in foot-candles. The insulating base 68 of the meter is rigidly attached to the plate 73 provided with the four spacing members 74 which at their free ends are secured to the closure plate 43 by the screws 75. It should thus be clear that the photovoltaic device 44 and illumination indicating instrument 45 are mounted for conjoint movement relative to the casing.

In using either of the illuminometers illustrated in the drawings the instrument under investigation is first removed from the panel opening and the illuminometer substituted therefor. The perforated circumferential flange of the illuminometer casing makes it possible to use the same screw holes on the panel for mounting the illuminometer that are utilized for mounting the displaced instrument casing. The closure plate is then successively adjusted causing the photovoltaic device to revolve about the longitudinal axis of the casing.

By noting the angular position of the photovoltaic device and the reading of the meter corresponding thereto at each of its successive positions of adjustment, it is possible to determine the distributed illumination over the displaced instrument dial. Since the illumination is measured on a surface which is as nearly as practicable in the same location with respect to the source of illumination as the indicial markings of the displaced dial and the meter reading is expressed directly in foot-candles, no computations are necessary.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An illuminometer comprising in combination a casing provided with a longitudinal axis, a closure plate for said casing revolvable about the longitudinal axis thereof, a photovoltaic device mounted on the said plate to change its angular position with reference to the casing as the plate revolves and an illumination indicating instrument disposed within said casing and electrically connected to be energized by the aforesaid device.

2. An illuminometer comprising in combination a casing provided with a longitudinal axis, a closure plate for said casing revolvable about the longitudinal axis thereof, a photovoltaic device and an illumination indicating instrument disposed within said casing and electrically connected, the said device being mounted on the closure plate to change its angular position with reference to the casing as the plate revolves and the said casing and plate being provided with cooperating indicia for indicating the angular position of the photovoltaic device.

3. An illuminometer comprising in combination a casing, a photovoltaic device viewable in all of its positions relative to the casing, means associated with the casing for mounting the light sensitive surface of said device for substantially uniplanar and revolvable movement and an illumination indicating instrument disposed within said casing, the said instrument being electrically connected to be energized by the aforesaid device in all angular positions of the same and the said device being mounted to change its angular position with reference to the casing as it moves relative thereto.

4. An illuminometer comprising in combination a casing provided with a longitudinal axis, a photovoltaic device disposed within said casing, means for mounting the said device for revolvable movement relative to the longitudinal axis of the casing to be viewable in all positions of the same, and an illumination indicating instrument disposed within said casing the said instrument being electrically connected to be energized by the aforesaid device in all angular positions of the same and the said device being mounted to change its angular position with reference to the casing as it moves relative thereto.

5. An illuminometer for measuring the distributed illumination on the dial of a panel mounted instrument, comprising in combination a casing capable of being mounted on a panel to occupy substantially the position of the instrument under investigation, a photovoltaic device, means associated with the casing for revolvably adjusting the light sensitive surface of the said device in substantial coincidence with the position formerly occupied by the dial surface under investigation, and illumination indicating means disposed within said casing, the said last mentioned means being electrically connected to be energized by the aforesaid device and the said device being mounted to change its angular position with reference to the casing as it moves relative thereto.

6. An illuminometer comprising in combination a casing provided with a longitudinal axis, a photovoltaic device disposed within said casing, means for mounting the said device for revolvable movement relative to the longitudinal axis of the casing to be viewable in all positions of the same, and an illumination indicating instrument disposed within said casing the said instrument and device being relatively movable and electrically connected in all relative positions and the said device being mounted to change its angular position with reference to the casing as it moves relative thereto.

7. An illuminometer comprising in combination a casing, an illumination indicating instrument disposed within said casing and a photovoltaic device electrically connected therewith, and means for mounting the said device and instrument for conjoint movement relative to the casing, the said device being mounted to change its angular position with reference to the casing as it moves relative thereto.

8. An illuminometer comprising in combination a casing provided with a longitudinal axis, a plate mounted for revolvable movement about the longitudinal axis of the casing, a photovoltaic device mounted on the said plate to change its angular position with reference to the casing as the plate revolves and an illumination indicating instrument disposed within said casing and electrically connected to be energized by the aforesaid device in all angular positions of the same.

9. An illuminometer comprising in combination a casing provided with a longitudinal axis, a plate mounted for revolvable movement about the longitudinal axis of the casing, a photovoltaic device mounted on the said plate to change its angular position with reference to the casing as the plate revolves, a plurality of contact members engaging opposite sides of the photovoltaic device, one of said members being disposed intermediate one side of the photovoltaic device and the aforesaid plate and at least one of the members being resilient and flexed, means secured to said plate for causing an intimate electrical engagement between the contact members and the opposite sides of the photovoltaic device, an electrical illumination indicating instrument disposed within said casing and means for electrically interconnecting the said instrument and contact members.

10. An illuminometer comprising in combination a casing, a revolvably mounted closure plate for said casing, the said plate being light pervious at least in part, a photovoltaic device mounted on the said plate to change its angular position with reference to the casing as the plate revolves and an illumination indicating instrument disposed within said casing and electrically connected to be energized by the aforesaid device, the said photovoltaic device and instrument being viewable through the plate.

11. An illuminometer comprising in combination a casing, a revolvably mounted closure plate for said casing, the said plate being light pervious at least in part, a photovoltaic device mounted on the said plate to change its angular position with reference to the casing as the plate revolves, a plurality of contact members engaging opposite sides of the photovoltaic device, one of said members being disposed intermediate one side of the photovoltaic device and the aforesaid plate, means secured to said plate for causing an intimate electrical engagement between the contact members and the opposite sides of the photovoltaic device, an electrical illumination indicating instrument supported from said plate for movement therewith and means for electrically interconnecting the said instrument and contact members, the said photovoltaic device and instrument being viewable through the plate.

12. An illuminometer comprising in combination a casing, a revolvably mounted light pervious closure plate for said casing, a photovoltaic device mounted on the said plate to change its angular position with reference to the casing as the plate revolves, a plurality of contact members engaging opposite sides of the photovoltaic device, one of said members being disposed intermediate one side of the photovoltaic device and the aforesaid plate, means secured to said plate for causing an intimate electrical engagement between the contact members and the opposite sides of the photovoltaic device, an electrical illumination indicating instrument stationarily mounted relative to the casing, conductors for electrically interconnecting the said instrument and contact members, and conductor confining means disposed intermediate the photovoltaic device and instrument, the said photovoltaic device and instrument being viewable through the plate.

JOHN A. BARTELT.